March 19, 1963
I. N. SMITH
3,082,143
METHOD OF FORMING A SUBSTANTIALLY RIGID
LAMINATED FIBROUS BOARD
Filed March 8, 1957
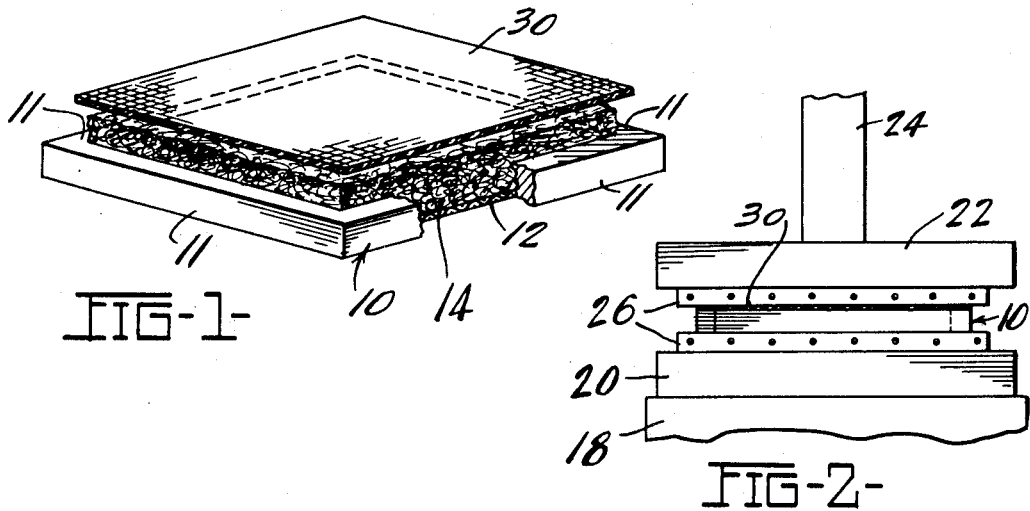
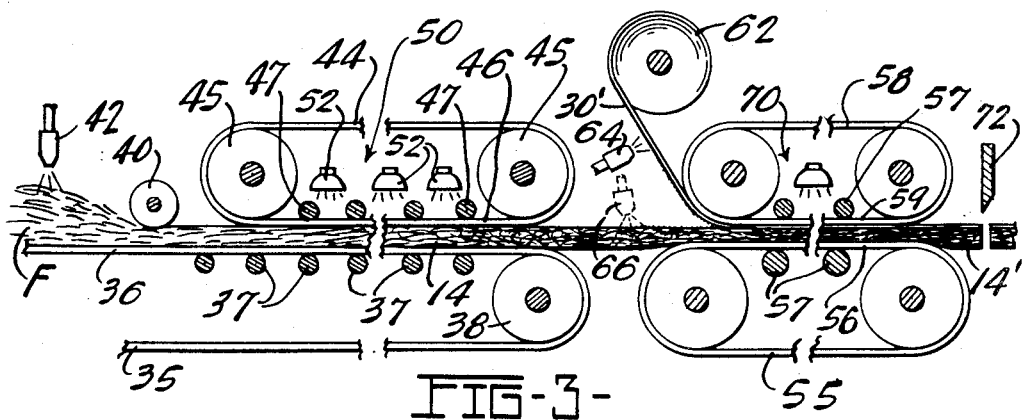
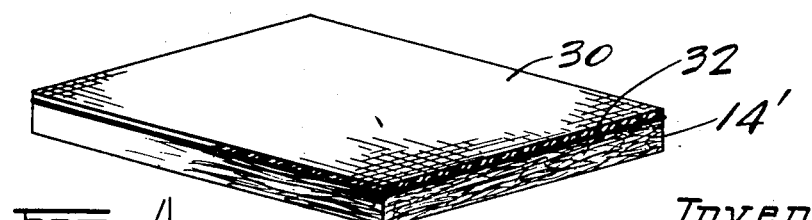
Inventor:
IRVING N. SMITH.
By Hachie & Overman
Attys.

United States Patent Office 3,082,143
Patented Mar. 19, 1963

3,082,143
METHOD OF FORMING A SUBSTANTIALLY RIGID LAMINATED FIBROUS BOARD
Irving N. Smith, San Jose, Calif., assignor to Owens-Corning Fiberglas Corporation, a corporation of Delaware
Filed Mar. 8, 1957, Ser. No. 644,896
7 Claims. (Cl. 156—229)

This invention relates to surfacing sections or units and more especially to surfacing units such as acoustical tiles, flexible boards, sheets or sections formed of fibrous material and method of and apparatus for producing such units.

Wall surfacing units or wall boards having acoustic or sound attenuating characteristics have been formed of fibrous materials such as glass fibers by compressing a comparatively thick mass of binder-laden fibers to a dense mat formation which, in a compressed state, is subjected to a heating or curing step to set the binder to retain the fibers of the mat in a compressed condition. Tiles or form boards formed of mineral fibers such as glass, slag or fusible rock are replete with voids or interstices providing sound damping or attenuating properties and the mineral fibers thereof are substantially immune to fungus growth and are fire resistant. Such boards or tiles are sufficiently rigid to be utilized as ceiling and side walls and it is possible to paint or decorate surface areas of the boards. However, the surface areas of boards of this character have a certain degree of roughness or unevenness which detracts from the pleasing appearance of a room surfaced with units of this character.

Endeavors have been made to face a major surface of acoustical tiles or form boards with a fabric or thin bonded web of mineral fibers such as glass, but difficulties have been encountered in applying or laminating a facing layer with a mat or board of bonded fibers and avoiding the formation or presence of wrinkles or ridges in the surfacing layer.

The present invention embraces the provision of a method which is especially suitable for applying a surfacing layer such as a textile or web made of mineral fibers to a mass or mat of fibers of comparatively low density in a manner whereby a wrinkle-free surfacing is attained.

An object of the invention is the provision of a method of applying a fabric facing to a fibrous board or mat wherein the fibers are bonded together by momentarily compressing the board or mat and concomitantly curing or setting an adhesive to join the board or mat to the fabric and the pressure released at the completion of the curing step whereby a wrinkle-free facing is provided by the fabric.

Another object of the invention is the provision of a method for producing a laminated product of this character which is adaptable for forming individual laminated sheets or sections by using a unit press or which may be advantageously utilized to form the product in continuous length which may be subsequently severed into sections of desired dimensions.

Another object of the invention is the provision of a method for confining binder coated fibers in a compressed state and curing the binder to form a board, applying an adhesive-bearing fabric facing to the cured board, further compressing the board and curing the adhesive while the board is compressed whereby upon completion of the curing step and release of compression pressure, the board regains its normal thickness under the inherent resiliency of the fibers and the cloth facing is stressed or tensioned so as to present a wrinkle free surface.

Still a further object of the invention is the provision of a method of forming a textile-faced fibrous board or section wherein the fibrous board or section is slightly or partially compressed during the bonding or joining of the textile facing thereto whereby the textile is stressed to provide a smooth surface upon removal of pressure applied during the bonding operation.

A further object of the invention is the provision of an apparatus for confining and compressing a mass of binder impregnated mineral fibers while the binder is being cured and for bonding a facing layer of fabric, web or similar layer formed of glass fibers or filaments to the mass of bonded mineral fibers.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an isometric view of a fiber confining means utilized in performing steps in the method of the invention;

FIGURE 2 is an elevational semi-diagrammatic view of a platen press for performing steps in the method of the invention;

FIGURE 3 is a semi-diagrammatic view of apparatus utilized for continuously forming a laminated product, and FIGURE 4 is an isometric view of the laminated product produced through the utilization of the method of the invention.

While the method of the invention is especially adaptable for producing bonded fibrous mats or form boards faced with a fabric, web or surfacing layer formed of mineral filaments or fibers, it is to be understood that the method may be utilized for forming other laminated products.

The principles of the method of the invention embrace the steps of curing the binder in a group or mass of mineral fibers, such as glass fibers, compressed to a desired thickness to provide a fiber mat or board. The method involves additional steps of applying an adhesive-bearing or adhesive-coated fabric, web or layer preferably formed of mineral filaments or fibers to the bonded fibrous mass or form board and compressing the bonded fibrous mass while applying heat to set the adhesive joining the fabric or layer to the board or fibrous mass. Upon release of forces of compression applied to the bonded fibrous board or fibrous mass, the resiliency of the fibers restores the board or fibrous mass to its original bonded thickness and by reason of the compression applied through the fabric or layer to the bonded mass, a wrinkle-free, smooth surface is provided by the fabric or layer bonded to the fibrous board or bonded fibrous mass.

Applicant's method involves steps of forming a mat, board or bonded fibrous mass of predetermined size and joining a fabric facing layer thereto or the method steps may be carried on continuously to form the product as a continuous strip.

Referring to the drawings in detail, and initially to FIGURES 1 and 2, the apparatus includes a fiber-confining means or fixture in the form of a substantially rectangular frame 10 formed of members 11 which is faced by screen or mesh material 12 providing a support and confining means for a mass of mineral fibers 14 which are impregnated or coated with a heat curable binder. The screen or mesh material 12 provides a facile support for the mass of fibers for transporting them from the region of formation of the fibers to a platen press or apparatus for compressing the mass of fibers and curing the binder. While the fiber confining means or frame 10 is of a rectangular configuration as illustrated in FIGURE 1 of the drawings, it is to be understood that other shapes or sizes of frame or fixture may be utilized if desired.

FIGURE 2 is illustrative of a platen press including a press frame 18, which supports a bed plate or platen 20. Disposed above the platen 20 is a second platen or ram 22 which may be supported by a piston rod 24 or other means arranged to be actuated or moved in the direction of its axis to bring the platens 20 and 22 into proper position for compressing a mass of fibers 14 contained within the frame 10.

Each of the platens 20 and 22 is provided with a heating unit or element 26 as shown in FIGURE 2. The fiber supporting means or frame 10 is preferably of rectangular shape and of a height which is less than the ultimate thickness of the mass of fibers contained within the frame when compressed and bonded to form a mat. The heating units 26 are preferably electrically energized and are controlled to provide a uniform curing temperature for setting the binder in the fibers. The units 26 may be heated by superheated steam or other suitable heating medium.

The apparatus illustrated diagrammatically in FIGURES 1 and 2 for carrying out the method is utilized to compress and cure a mass of binder-impregnated or coated fibers, preferably mineral fibers such as glass fibers, to form a bonded product of desired thickness and density as one phase of the method. The apparatus is arranged for carrying on or performing succeeding phases of the method including bonding a layer of textile or web of fibers 30 to the prebonded mass of fibers so that the textile or surfacing layer provides the end product with a smooth, wrinkle-free surface.

The steps in the method performed through the utilization of the apparatus shown in FIGURES 1 and 2 is as follows: A quantity of mineral fibers 14 such as glass fibers or fibers made from molten slag or fusible rock is delivered into the space defined by the members 11 forming the frame 10 to a depth of several inches.

The quantity or mass is supported by the screen or mesh material 12 which is preferably made of glass or other mineral fibers or filaments. The fibers are impregnated or coated with a suitable binder or adhesive preferably of a character which is thermosettable such as phenol-formaldehyde, urea-formaldehyde, melamine-phenolic resin or similar bonding materials although thermoplastic binders may be used. The uncured bonding material or adhesive may be applied onto the fibers at the time they are formed or the binder may be delivered onto the fibers after they have been positioned within the frame 10.

The frame or fixture 10 bearing the quantity or thick mass of fibers 14 is disposed on the lower heating element 26 carried by the bed plate or lower platen 20 of the press. The upper platen or ram 22 carried by the movable rod 24 is moved toward the platen 20 to engage the heating elements 26 with the fibers and compress the mass or quantity of fibers within the frame to a desired thickness which is greater than the height of the frame 10. The mat or board of compressed fibers may be of a thickness of from about three-quarters of an inch to two inches or more. The density of the compressed fibrous mass or mat is preferably from two to six pounds per cubic foot depending upon the particular use for the end product. The density may be varied by modifying the quantity of fibers delivered into the frame 10 or the mass of fibers may be compressed to a particular thickness to secure a desired density. With the press platens in "closed" position, that is, in a position compressing the fibers to a particular thickness, heat provided by the energization of the heating elements 26 sets up or cures the binder or adhesive while the fibers are confined within the fixture or frame 10 in a compressed state.

It has been found that a usual curing period is from three to eight minutes at a temperature of 425° Fahrenheit, the cure time being in a measure dependent upon the density of the mat of fibers and the thickness of the mat.

It is preferable that the heating units 26 be continuously energized and the cure time is inclusive of the period initiated at the first engagement of the relatively movable heating unit 26 with the fibers during the compressing operation and terminating with the opening movement of the upper heating unit as the completion of a curing operation.

As the upper platen 22 and the heating unit 26 carried thereby move upwardly toward open position, the frame 10 and the mass or mat of compressed and bonded fibers are removed from the press. The bonded fibrous mass or mat 14 is then removed from the frame and if desired may be trimmed to a predetermined size.

A layer or sheet of textile 30, one surface of which is provided with an adhesive or bonding agent such as a copolymer vinyl resin or a thermosettable binder such as phenolformaldehyde is placed upon a major surface of the bonded mass or mat of fibers with the uncured adhesive or binder disposed between the textile and the fibrous mass. The layer may be a woven or unwoven textile preferably formed of glass filaments or fibers or may be a comparatively thin web of fibers or filaments of mineral material such as glass prebonded into sheet formation. The mass or mat of bonded fibers 14 with the textile 30 disposed thereon is replaced in the frame 10 and the frame, mass of bonded fibers and textile are then positioned between the heating elements 26 of the press.

The press ram 24 is moved downwardly to bring the upper heating element 26 into engagement with the layer or sheet 30. The extent of downward movement of the upper platen 22 is determined by suitable stops or limiting means (not shown) to predetermine the extent of further compression of the bonded mat 14.

One of the major features of the method of the invention is the further compression of the bonded mass or mat of fibers concomitantly with the curing of the adhesive disposed between the sheet or layer and the fibrous mass 14. The platen 22 is moved downwardly a distance sufficient to further compress the bonded mat of fibers 14. It has been found that a further compression of the mat from two-thirds to three-quarters of its normal thickness depending upon the density of the mat may be accomplished without materially impairing the inherent resilient characteristics of the fibers in bonded condition to spring back or return to their original density and thickness after the forces of compression have been removed.

The adhesive or binder between the layer or textile 30 and the fibrous mass 14 is set up, fused or cured by heat from the units 26 while the bonded fibrous mass 14 is maintained compressed to a lesser than normal thickness. It has been found that a thermoplastic adhesive such as a copolymer vinyl resin on the layer or textile 30 may be softened or fused in about one minute with the temperature at about 300° Fahrenheit.

If a thermosetting resin is used as an adhesive, such as phenolformaldehyde a slightly longer cure time at a higher temperature is required. As a typical example, a bonded fibrous mat one inch thick and of a density of about three pounds per cubic foot is temporarily further compressed to a thickness of about two-thirds of an inch during the adhesive curing or setting period.

When the press is opened and the compression pressure released it is found that the textile or surfacing layer is tensioned or stressed to the extent that it is completely flat and wrinkle-free and presents a smooth and uninterrupted surface. It is believed that the further compression of the bonded fibrous mass may have an effect upon the surface fibers adhesively bonded or joined to the textile or layer as to establish or set up stress or tension forces in the textile or layer which provides a permanent tension or stretch in the textile or layer which occurs or is established when the compression pressures are removed from the prebonded mass or mat of fibers 14, the latter returning to its original thickness.

The finished product is illustrated in FIGURE 4 wherein the compressed mass of bonded fibers 14' is joined to the textile or layer 30 by means of a cured adhesive or binder designated 32.

The fibrous board or laminated product formed by the method is preferably of comparatively low density between two and six pounds per cubic foot, which densities permit the further compression of the mat or mass of bonded fibers without appreciably disturbing the bond or orientation of the fibers in bonded condition. The end product is of semi-rigid character and may be flexed to a substantial degree. It is particularly usable for interior walls and ceilings. The flat, unwrinkled surface provided by the textile or layer may be painted or otherwise decorated in the manner of conventional wall board.

The arrangement illustrated in semi-diagrammatic form in FIGURE 3 is adapted to provide or perform continuous operation of the method steps of the invention. The apparatus is inclusive of a conveyor 35 the upper flight 36 of which constitutes a collecting surface upon which fibers F are collected from a forming hood or other fiber attenuating or fiber forming means (not shown). The conveyor 35 is supported by suitable rolls, one of which is illustrated at 38 and may be driven by a motor through suitable speed reducing mechanism (not shown). The mass of haphazardly arranged individual fibers F are advanced in a right hand direction by the movable flight 36 of the conveyor. The fibers carried by the conveyor move beneath a compacting or compressing roll or means 40 for compressing the fibers to a predetermined thickness.

A suitable binder or adhesive is distributed throughout the collected fibers by means of spray nozzles or applicators 42. The binder is preferably of the thermosetting type such as phenolformaldehyde, ureaformaldehyde or melamine-phenolic resin.

Disposed above the flight 36 of the conveyor 35 and adjacent the compacting means 40 is a fiber compacting or compressing means in the form of an endless belt or conveyor 44 which is supported upon rolls 45, the lower flight 46 engaging the upper major surface of the mass or mat 14 of fibers compressing the same between the flights 36 and 46 of conveyors 35 and 44 respectively. The flight 46 is backed by thrust rollers 47. The conveyor flights 36 and 44 preferably move at the same linear speed and advance the fibrous mass 14 through a curing station or zone 50. The conveyors 44 and 35 are preferably formed of the foraminous or mesh type metal to facilitate circulation of heat through the fibrous mass to cure the adhesive or binder. The curing station 50 may be equipped with suitable heating means 52 in the form of heat lamps or electrically energized resistance units capable of providing a temperature of 425° Fahrenheit or more for setting or curing the binder or adhesive in the fibrous mass. The flight 36 of the conveyor 35 may be supported by additional rollers 37 to maintain the flight against sagging so as to hold the fibrous mass 14 in a state of compression while the mass moves through the binder curing zone 50.

The fibrous mass or mat 14 with the binder in cured or set condition is continuously advanced to a station at which a surfacing layer or textile is moved into contiguous relation with a major surface of the fibrous mass.

As shown in FIGURE 3, an endless type conveyor 55 has an upper flight 56 in coextensive relation with the lower surface of the advancing fibrous mat. Disposed above the flight 56 is a conveyor 58 of the endless type, the lower flight 59 of which is disposed in parallelism with the flight 56. Supplemental rollers 57 maintain the flights 56 and 59 in parallelism so as to compress the fibrous mass 14. A textile or layer 30' of glass fibers or filaments or other suitable surfacing material is drawn from a supply 62 and delivered into contiguous relation with the upper surface of the fibrous mass 14 and adjacent the flight 59 of the upper conveyor. Adhesive or binder is disposed between the surfaces of the textile 30' and the mat 14. The adhesive or binder may be applied to the surface of the textile 30' by means of applicators 64, one of which is shown in FIGURE 3, or the adhesive may be delivered onto the surface of the fibrous mat 14 through the use of applicators 66, one of which is shown in broken lines in FIGURE 3. If desired, binder or adhesive may be delivered onto both the textile and the bonded fibrous mat. The distance between the conveying surfaces of the flights 56 and 59 of conveyors 55 and 58 is less than the distance between the fiber engaging surfaces of the conveyor flights 36 and 46.

Thus the bonded mass or mat of fibers 14 entering the region between the conveyor flights 56 and 59 is further compressed and maintained in such compressed condition during the curing or setting of the adhesive to join the textile 30' onto a surface of the fibrous mass.

The fibrous mass 14 and textile 30' are advanced by the conveyor flights 56 and 59 through a curing station or zone 70 at which heat or heated air is applied to textile and mat in assembled relation to fuse, set or cure the binder disposed between the textile and mass of fibers. The curing operation at station 70 takes place while the fibrous mass 14 is in its maximum compressed condition.

The assembled and bonded fibrous mat and textile is delivered from engagement with the conveyor flights 56 and 59 as the latter move in a right hand direction as viewed in FIGURE 3. When the compression pressure upon the bonded mat or mass of fibers 14 is relieved, the fibers spring back or return to their original positions thus reestablishing the mat 14 to its original thickness. It is found that by applying the textile or surfacing web to the mass of bonded fibers 14 with the mass under additional compression, the textile on the finished product is stressed or tensioned so as to present a smooth, flat, unwrinkled surface particularly suitable to receive paint or other coating for presenting a finished appearance.

As previously stated an important feature of the invention involves the step of additional or further compression of a bonded mass of fibers while a textile or surfacing web is being bonded thereto. This method is successfully accomplished with bonded masses of fibers preferably of densities between two and six pounds per cubic foot and of a thickness which renders the product of semi-rigid character. The method may be successfully utilized to stress a textile or web applied to any mass of bonded fibers which is of a density permitting further compression without impairing the characteristics of the bonded fibers to spring back or return to normal thickness when the compressive forces are removed or relieved. In the method for continuously forming the laminated product, the continuous strip or product may be severed into sections by means of a knife 72.

It is apparent that, within the scope of the invention, modifications and different arrangements may be made other than is herein disclosed, and the present disclosure is illustrative merely, the invention comprehending all variations thereof.

I claim:

1. A method of forming a substantially rigid laminated fibrous product including the steps of delivering a surfacing layer formed of integrated glass fibers adjacent a surface of a bonded relatively dense mat of compressed mineral fibers with an adhesive disposed between the surfacing layer and the bonded mat, further compressing the bonded mat from two-thirds to three-quarters of its normal thickness while in contact with a surfacing layer, setting the adhesive while maintaining the bonded mat in a state of compression, and relieving compression pressure after setting the adhesive whereby the bonded mat returns to its original bonded thickness with the surfacing layer in stressed and wrinkle-free condition.

2. A method of forming a substantially rigid laminated fibrous board including the steps of compressing a mass of mineral fibers, integrating the mass while under compression into a bonded unit with a bonding material, disposing a surfacing layer of woven textile adjacent a surface of the unit with an uncured bonding material between the surfacing layer and the unit, further compressing the bonded unit from two-thirds to three-quarters of its normal thickness while in contact with the surfacing layer, and setting the bonding material between the surfacing layer and the unit while maintaining the unit in a compressed condition.

3. A method of forming a substantially rigid laminated fibrous board including the steps of compressing a mass of mineral fibers bearing an uncured bonded material to a density of from two to six pounds per cubic foot, curing the bonding material in the fibrous mass while maintaining the mass of fibers in a state of compression to form a high density bonded mat of fibers, delivering a surfacing layer of textile material into contiguous engagement with a major surface of the bonded mat with an adhesive disposed between the surfacing layer of textile material and the mat, further compressing the bonded mat from two-thirds to three-quarters of its normal thickness while in contact with the surfacing layer, and setting the adhesive to bond the surfacing layer to the bonded mat while maintaining the bonded mat in compressed condition.

4. A method of forming a laminated fibrous board including the steps of delivering a mass of mineral fibers into a confined region, distributing an uncured binder onto the mineral fibers, applying pressure only the fibrous mass to compress the confined mass to predetermined thickness and of a density of from two pounds to six pounds per cubic foot, applying heat to set the binder in the compressed mass of confined fibers forming a bonded unit, delivering a surfacing web of mineral fibers onto the bonded unit with adhesive disposed between the unit and fibrous web, applying pressure to further compress the bonded unit from two-thirds to three-quarters of its normal thickness, setting the adhesive between the unit and surfacing web, and releasing the pressure whereby the bonded unit expands to its original thickness and the web stressed to wrinkle-free condition.

5. A method of forming a substantially rigid laminated fibrous board including the steps of compressing a mass of mineral fibers coated with a thermosetting binder to a predetermined thickness, applying heat to the mass of fibers to cure the thermosetting binder while maintaining the mass in a state of compression to form a bonded fibrous mat, delivering a layer of textile of mineral fibers bearing a heat-settable binder on a surface thereof into engaging relation with a major surface of the bonded mat with the binder on the textile contacting the mat, further compressing the bonded mat from two-thirds to three-quarters of its normal thickness while in contact with the textile and applying heat to soften the binder disposed between the mat and textile while maintaining the bonded mat under compression to adhere the textile to the bonded mat, and relieving the forces of compression on the bonded mat whereby the mat returns to its former thickness with the textile in stressed condition.

6. A method of forming a substantially rigid laminated fibrous board including the steps of forming a mass of mineral fibers, delivering an uncured binder onto the mass, compressing the fibrous mass to a thickness of from three-quarters of an inch to two inches and of a density of from two to six pounds per cubic foot and advancing the compressed mass through a curing station, applying heat to cure the binder while the mass is in a state of compression to form a bonded mat, concomitantly advancing the bonded mat and a surfacing layer of textile toward a laminating station, delivering an adhesive to a region whereby the adhesive is disposed between adjacent surfaces of the textile and mat, compressing the bonded mat to a thickness from two-thirds to three-quarters of its normal thickness with the textile disposed thereon, advancing the compressed mat and textile to a heating station, heating the adhesive while maintaining the bonded mat under compression to join the textile to the mat, and relieving the compression pressure whereby the fibers of the mat are returned to their original bonded orientation stressing the textile to provide a wrinkle-free surface.

7. A method of forming a substantially rigid laminated fibrous board including the steps of forming a mass of mineral fibers, distributing an uncured binder onto the mineral fibers, applying pressure onto the fibrous mass to compress the mass to a density of from two to six pounds per cubic foot, setting the binder in the compressed mass of fibers forming a bonded mat of compressed fibers, delivering a layer of woven textile formed of glass fibers onto the bonded mat with adhesive between the mat and textile layer, applying pressure to further compress the bonded mat to a thickness of from two-thirds to three-quarters of its normal thickness, setting the adhesive between the compressed bonded mat and textile layer, and releasing the pressure whereby the bonded mat expands to its original density with the textile layer in tensioned condition.

References Cited in the file of this patent

UNITED STATES PATENTS

| | | |
|---|---|---|
| 2,393,947 | Ximenez | Jan. 29, 1946 |
| 2,566,619 | Lyon et al. | Sept. 4, 1951 |
| 2,653,986 | Philipps | Sept. 29, 1953 |
| 2,698,271 | Clark | Dec. 28, 1954 |
| 2,744,044 | Toulmin | May 1, 1956 |
| 2,746,894 | Orser et al. | May 22, 1956 |
| 2,830,648 | Haddox | Apr. 15, 1958 |
| 2,890,147 | Pearson et al. | June 9, 1959 |

FOREIGN PATENTS

| | | |
|---|---|---|
| 673,934 | Great Britain | June 18, 1952 |